United States Patent [19]

Livings et al.

[11] Patent Number: 4,590,679
[45] Date of Patent: May 27, 1986

[54] COMPASS SYSTEMS

[75] Inventors: Rodney Livings, Havant; Harjit Singh, Portsmouth, both of England

[73] Assignee: Nautech Limited, Portsmouth, England

[21] Appl. No.: 563,446

[22] Filed: Dec. 20, 1983

[30] Foreign Application Priority Data

Dec. 30, 1982 [GB] United Kingdom ................ 8236957

[51] Int. Cl.$^4$ .............................................. G01C 17/28
[52] U.S. Cl. ..................................... 33/361; 33/363 Q
[58] Field of Search ................. 33/361, 363 R, 363 Q, 33/355, 356

[56] References Cited

U.S. PATENT DOCUMENTS

| 3,840,726 | 10/1974 | Harrison | 33/355 |
| 3,971,981 | 7/1976 | Nakagome et al. | 33/361 |
| 4,305,035 | 12/1981 | Mach et al. | 324/255 |
| 4,424,631 | 1/1984 | Franks | 33/361 |

FOREIGN PATENT DOCUMENTS

3044020 6/1982 Fed. Rep. of Germany .
5757209 9/1980 Japan .
24811 2/1983 Japan .................................... 33/361

Primary Examiner—Willis Little
Attorney, Agent, or Firm—C. Michael Zimmerman

[57] ABSTRACT

A drive circuit applies an oscillating signal to the drive coil of the fluxgate thereby generating output pulses from the detection coils of the fluxgate, which pulses have an area proportional to the magnetic flux through that coil. The output pulses are integrated sequentially by an integrator. The output may be used directly to obtain the orientation of the fluxgate, and hence of a vessel in which the fluxgate is mounted but it is preferable on the grounds of accuracy and speed of response to apply a predetermined number of pulses from each detection coil, apply a constant signal to the integrator and measure the times between the application of that constant signal and the integrator output attaining a predetermined value. This may be measured digitally giving a more accurate measurement of the fluxgate orientation. Suitable error elimination means may be provided.

10 Claims, 22 Drawing Figures

COMPASS SYSTEMS

BACKGROUND OF THE INVENTION

1. Field of the Invention

The present invention relates to compass systems which use a fluxgate to measure the orientation of the vessel in which the system is mounted relative to the earth's magnetic field.

A fluxgate operates by the induction of pulses in detection coils by current applied to a drive coil. All the coils may have a common core. Application of an alternating signal to the drive coil induces current pulses in the detection coils, the areas of which pulses is proportional to the component of the magnetic field perpendicular to the detection coil. The earth's magnetic field provides the magnetic flux through the detection coils, in the absence of other fields. Hence if the directions of the detection coils relative to the vessel are known, the pulses from the coils can be used to determine the angle of the earth's magnetic field relative to the detection coils, and hence the orientation of the vessel of that field.

2. Description of the Prior Art

Figure 1:
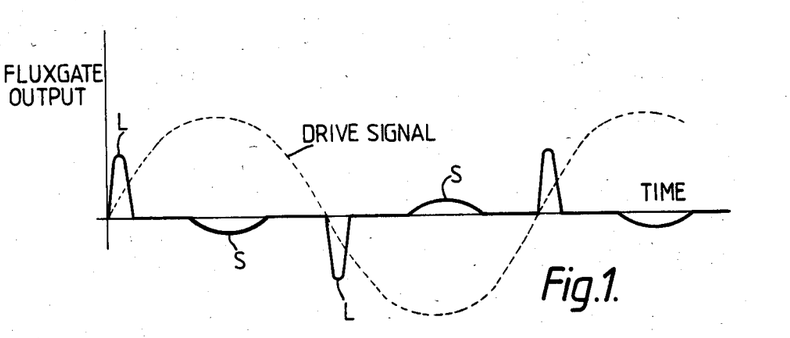
FIG. 1 shows the output from a fluxgate detection coil when a sinusoidally oscillating voltage is applied to its drive coil, and has already been discussed.

It is known to use a fluxgate as part of a compass system. The standard method of detecting the angle of the fluxgate to the field is to apply an alternating, e.g. sinusoidal, drive signal to the fluxgate and detect the phase of the outputs. FIG. 1 of the accompanying drawings shows the output produced by the fluxgate when an alternating drive signal in the form of a sinusoidal voltage (shown dotted) is applied to it. The area of each large and small pulse L and S respectively is the same and proportional to the field perpendicular to the detection coil. This output is analysed by filtering at twice the frequency of the drive signal and the phase angle between the drive signal and the output signal provides a measure of the angle between the perpendicular to the coil and magnetic north. Due to its filtering, this system is known as a second harmonic fluxgate. It has the disadvantage that active filters are needed for the filtering of the output of the fluxgate and it is essential that the drive signal should be accurately synchronised to prevent phase errors developing. For this reason, the detection circuits are complex and expensive, and pivoting magnet systems have been preferred.

SUMMARY OF THE INVENTION

The present invention seeks to provide a compass system using a fluxgate which is inexpensive and is simple to operate.

It proposes using an integrator to integrate sequentially the output pulses from two detection coils of the fluxgate, thereby to generate two outputs which are analysed in an analyser, e.g. a computer unit, to obtain the orientation of the fluxgate, and hence of a vessel in which the fluxgate is mounted. The present invention is applicable both to a method of determining the fluxgate orientation, and to a compass system which determines that orientation. Either the positive or negative component of the outputs from the detection coils (or even both with one component inverted) are fed to the integrator. The invention may be used as the compass element in a navigation system.

The present invention may find particular application as a marine compass system and may be connected to the autopilot of a vessel to provide automatic steering.

Normally, the two detection coils will be approximately perpendicular, as this enables the sine and cosine of the angle of the fluxgate relative to, e.g., magnetic north, to be derived easily. The signals corresponding to those sine and cosines may be then used directly to calculate the angle, but it is thought preferable to compare these signals with signals representing sine and cosine values of some reference angle calculated by the computer unit and vary the reference angle until a null result is obtained, at which point the angle of the fluxgate to magnetic north equals the reference angle.

The output of the integrator after a number of pulses have been fed to it from the fluxgate may be used directly to calculate the orientation of the fluxgate to magnetic north. However, if the number of pulses was small, the integrated output would also be small, making it difficult to obtain an accurate measurement. If the number was large, the speed of response of the system would be poor. Therefore it is preferable to use an indirect system which permits digital handling of the angle. A predetermined number of pulses from one detection coil of the fluxgate are applied to the integrator and then a constant signal is applied to the integrator so that it rises uniformly to a predetermined value. This is repeated for the other detection coil of the fluxgate and the two results used to calculate the angle of the fluxgate relative to magnetic north. This may be done by measuring the time between the application of the constant signal to the integrator and the integrator output reaching the predetermined value, for each detection coil. This may be done digitally as it is more accurate and permits digital processing of the results in the computer unit. Preferably a reference signal, being the time for the integrator output to rise from its initial value to the predetermined value (no fluxgate pulses applied), is subtracted from the two times derived above as this gives results directly proportional to the sine and cosine of the fluxgate orientation.

Preferably the two detection coils are approximately perpendicular. Any inaccuracy which would cause an error in the measurement of the fluxgate orientation, may be eliminated by suitably biasing the output pulses from the detection coils. Rotation of the fluxgate through 360° will expose any errors due to undesirable local magnetic fields; such errors may also be eliminated by suitable biasing of the output pulses.

BRIEF DESCRIPTION OF THE DRAWINGS

An embodiment of the invention will now be described in detail, by way of example, with reference to the accompany drawings in which.

DESCRIPTION OF THE PREFERRED EMBODIMENT

Figure 2:
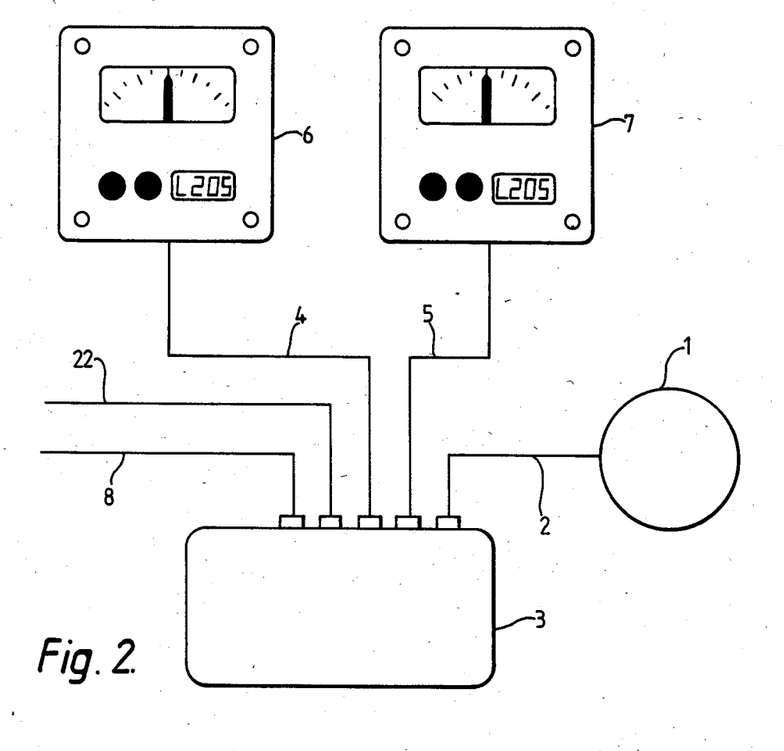
FIG. 2 is a schematic view of a compass system according to a preferred embodiment of the present invention.

Referring first to FIG. 2 a compass system for a marine vessel has a fluxgate 1 which is gimbal-mounted in the vessel so that it maintains constant attitude relative to the earth's magnetic field with the axes of the coils horizontal. The fluxgate 1 is connected via a cable 2 to a computer unit 3 containing a microprocessor which controls the operation of the system. The output of the computer unit 3 is fed via cables 4,5 to units which display the angle of the vessel relative to magnetic north, e.g. display units 6,7. The computer unit 3 is connected via cable 8 to a power source.

Figure 3:
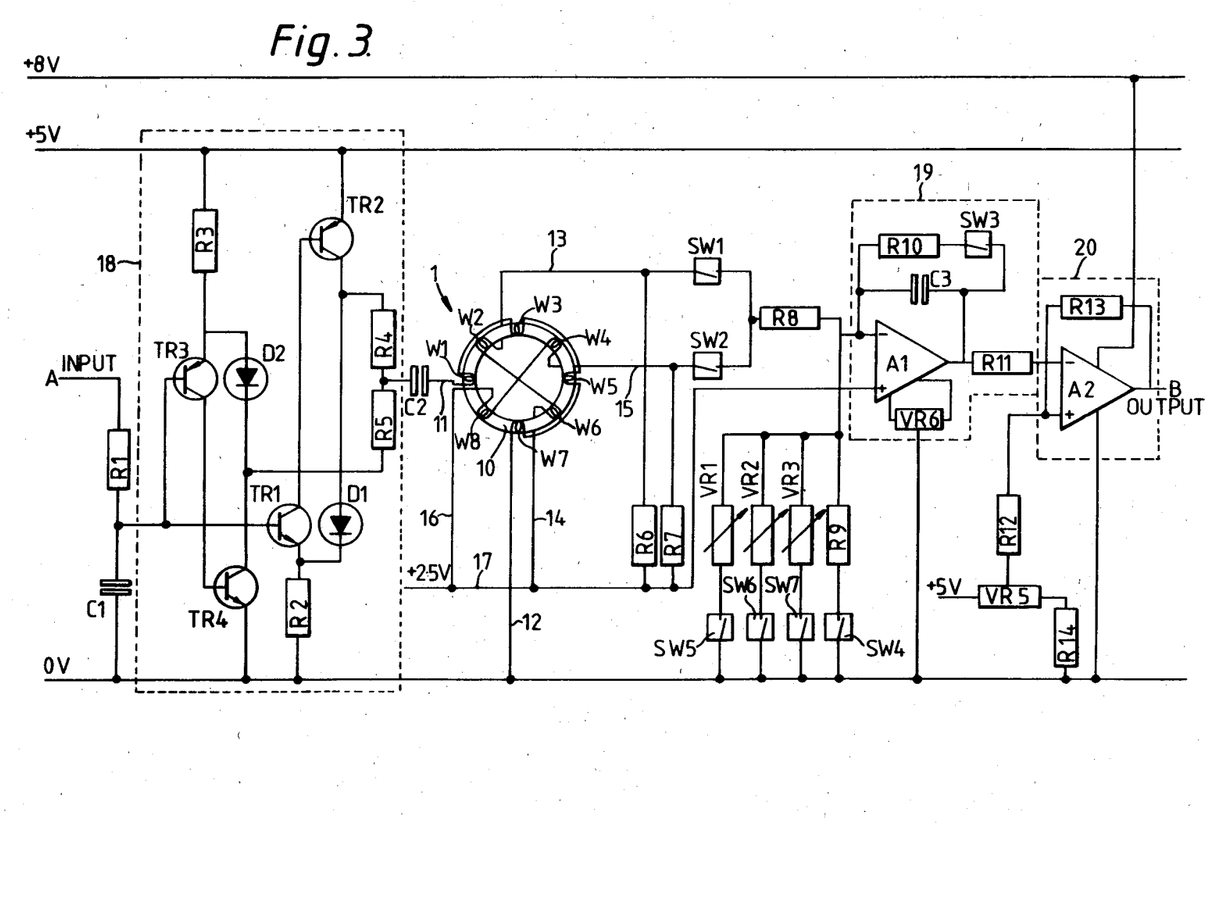
FIG. 3 is a circuit diagram of the fluxgate and part of the computer circuit of the system of FIG. 2.

Referring now to FIG. 3, the fluxgate 1 comprises a core 10 and eight windings W1 to W8. Windings W1, W3, W5 and W7 are connected in series between lines 11 and 12 and together form the drive coil. Windings W2 and W6 are connected in series between lines 13 and 14 and form a first detection coil. Similarly, windings W4 and W8 are connected in series between lines 15 and 16 and form a second detection coil, the axis of which is perpendicular to the axis of the first detection coil. Lines 14 and 16 are connected to a line 17, and lines 11, 13, 15 and 17 form the four cores of cable 2 from the fluxgate 1 to the computer unit 3 in FIG. 2. The remainder of the circuitry of FIG. 3 is entirely contained within the computer unit 3.

A square wave pulse (see FIG. 4a) from an oscillator driving at e.g. 10 KHZ is applied to input A of the drive circuit for the fluxgate 1. A series connection of resistor R1 and capacitor C1 limits the rise time of the pulses to eliminate R.F. generation and also ensure that the rise time of the pulse in the positive direction is equal to its rise time in the negative direction. If this is not done errors are generated in the system because the fluxgate 1 is very sensitive to the shape of the pulse applied to it.

The voltage pulses appearing across the capacitor C1 are then fed to an amplifier unit 18. This amplifier unit 18 may be any linear amplifier but as illustrated the input voltages across capacitor C1 are fed to the base electrodes of transistors TR1 and TR3 which are respectively in Darlington configuration with transistors TR2 and TR4. The output of each Darlington pair is applied at opposite ends of series connections of resistors R4 and R5, the output of the amplifier unit 18 being taken from the junction of those resistors R4,R5.

Figure 5:
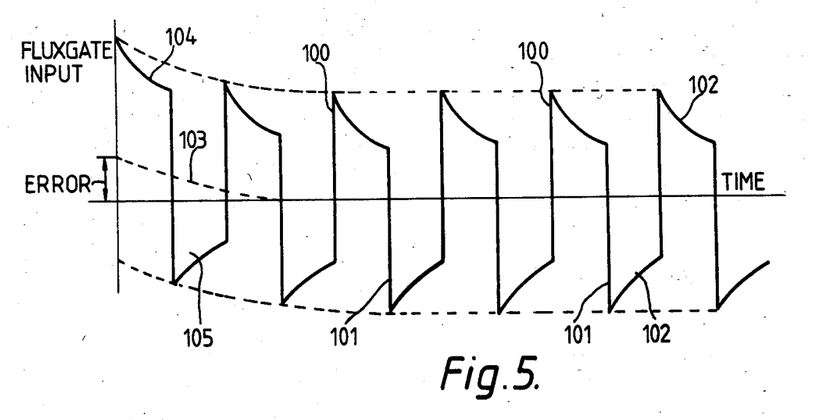

The output of the amplifier unit 18 is fed via capacitor C2 to line 11 to form the input to the fluxgate. Line 12 is connected to zero volts and hence the output of the amplifier unit 18 appears across the drive coil formed by windings W1,W3, W5, W7. The capacitor C2 is important in ensuring that the input to the fluxgate is exactly symmetrical about zero volts, thereby to ensure that errors in the output pulses from the fluxgate 1 due to inequality between the output due to positive input pulse and the output due to a negative input pulse are reduced or eliminated. As shown in FIG. 5 the output from the capacitor C2 (fluxgate input) comprises sharp rises and falls 100,101 when the leading and trailing edge of the amplified pulses are applied to it. Between these times the capacitor discharges. In steady state (right-hand side of FIG. 5) the discharging 102 of the capacitor will be equal from both a rise 100 and a fall 101. The rate of discharge of the capacitor at any time is related to the voltage to which it is charged at that time. Hence if there is a D.C. error e.g. the positive error 103 shown in FIG. 5, the discharge 104 of the capacitor from the positive pulse will be greater than the discharge 105 from the negative pulse. This effect causes a reduction in the error 103 from one cycle to the next. It has been found that with the circuit of FIG. 3, two cycles are sufficient to eliminate any D.C. errors occurring.

The outputs from the two detection coils of the fluxgate 1 are respectively fed via switches SW1 and SW2 to resistor R8 connected to the input of an integrator unit 19. The integrator unit has an amplifier A1 which receives the output of the resistor R8 at its inverting input, the non-inverting input being connected to a constant voltage source (line 17). The amplifier A1 and a capacitor C3 from the integration element, the integration unit also including a discharge circuit formed by resistor R10 and switch SW3, and a variable resistor VR6 for ensuring that the amplifier A1 has the correct offset. The input of the integrator unit 19 is also connected via resistor R9 and switch SW4 to zero volts.

The output of the integrator unit 19 is applied to a comparator unit 20 which compares that output with a reference voltage Vref applied via variable resistor VR5. Vref is e.g. 4 V. As the output of the integrator unit 19 is applied to the inverting input of the amplifier A2 of the comparator unit 20, the output (output B) of the comparator unit will be high except when the output of the integrator unit 19 is greater than the reference voltage Vref.

Figure 4A:
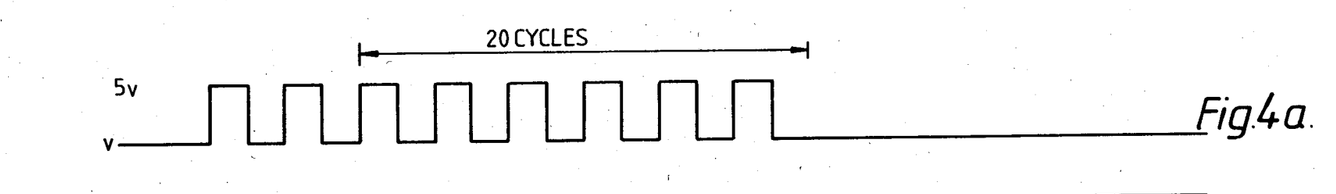
FIGS. 4a to 4c and 5 are graphs of signals in various parts of the circuit of FIG. 3.
Figures 4B, 4C:
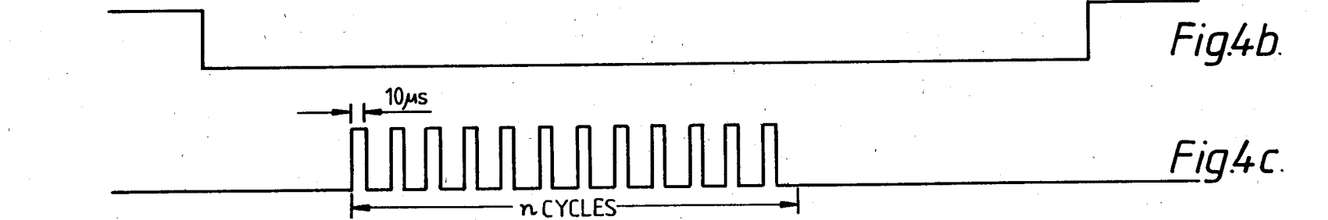

The operation of the circuit of FIG. 3 will now be described. Square wave pulses as shown in FIG. 4a are applied to input A, amplified in amplifier unit 18 and fed to the drive coil of the fluxgate 1 via capacitor C2. At the same time reset switch SW3 is opened. The activation of reset switch SW3 is controlled by the microprocessor in the computer unit 3, the signal applied to activate the switch being shown in FIG. 4b. Two pulses are fed to the input A to allow output of capacitor C2 to stabilise as shown in FIG. 5, then the pulses shown in FIG. 4c are fed to either switch SW1 or SW2. This gates the output of the corresponding detection coil.

When the signal shown in FIG. 5 is fed to the drive coil of the fluxgate 1, the output of the detection coil is similar to that shown in FIG. 1 except every alternate cycles is inverted so that all the large pulses L are positive and all the small pulses S are negative. If the output of a detection coil was fed directly to the integrator unit 19, the output of that unit 19 would be zero as the areas of the large L and small S pulses are equal. Therefore the switch SW1 or SW2 gates the output of the corresponding detection coil so that only the large pulses L are passed to the integrator. The pulses shown in FIG. 4c must be wide enough to pass the large pulses L; a pulse width of 10 μs has been found suitable. Since the large pulses L from the fluxgate correspond to the rises and falls of the pulses of FIG. 4a, the gating pulses are synchronised with those input pulses.

Assume now that the detection coil formed by windings W2 and W6 has its axis parallel to the longitudinal axis of the vessel and that the gating pulses shown in FIG. 4c are fed to switch SW1. The area of each pulse emitted by the fluxgate 1 is proportional to the horizontal component He of the earth's magnetic field at that point and also proportional to the size of the angle $\theta e$ that the vessel makes with the direction of the earth's magnetic field. Positive pulses each having an area proportional to the sine $\theta e$ are fed to the integrator for n cycles where n is an integer counted by the microprocessor and selected so that after n cycles the output of the integrator unit 17 has risen by a suitably high voltage e.g. 1 V. Due to the changes in the horizontal component of the earth's magnetic field with latitude, it is desirable that n may be varied by the microprocessor to ensure that the desired voltage output of the integrator unit 19 is achieved after n cycles. Normally n is about 20. During the n cycles the output of the integrator unit 19 will be less than the reference voltage Vref applied to amplifier A2 so that the output of the comparator unit 20 will be high.

Figure 4D:
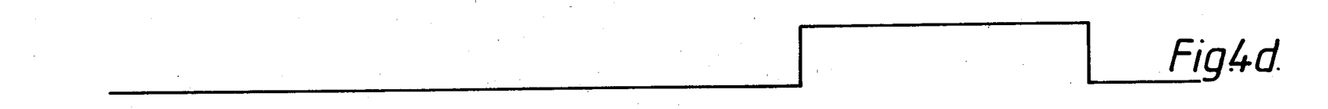
Figure 4E:
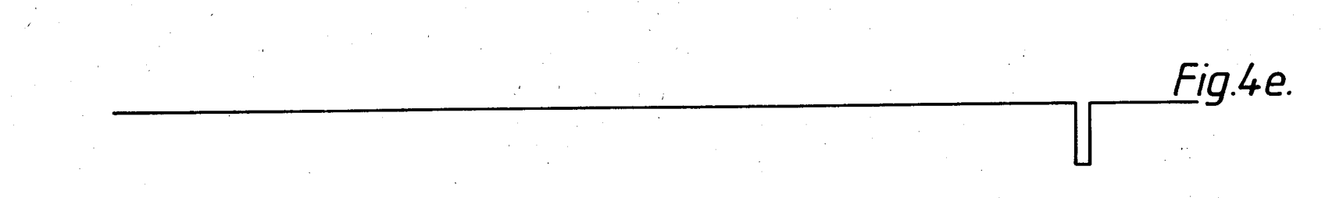

After n cycles, the pulses to switch SW1 are discontinued and the switch is left in the open position. At the same time switch SW4 is closed by application of a signal shown in FIG. 4d from the microprocessor, and the microprocessor starts to count. The integrator unit 19 is charged via resistor R9 and its output rises until it reaches Vref. Then the inputs to the comparator unit 20 are equal and the output of the comparator unit 20 falls as shown in FIG. 4e. This triggers the microprocessor to stop its count. If N1 is the count made by the microprocessor from the signal when switch SW4 is closed to the signal when the output of the comparator unit 21 falls, then N1 is related to the magnitude of the pulses from the first detection coil of the fluxgate 1. To complete the first measurement operation reset switch SW3 is closed by the signal shown in FIG. 4b and the system returns to its original state by discharge of capacitor C3 through resistor R10.

Then the measurement is repeated for the second detection coil formed by windings W4 and W8. The gating signal shown in FIG. 4c is applied to switch SW2 and the output of the second detection coil is fed to the integrator for the same number of cycles n as was the output from the first detection coil. After n cycles switch SW4 is closed and the microprocessor counts the time until the output of the comparator unit falls. The count N2 is again related to the magnetic field perpendicular to the second detection coil and hence to sin $(90° - \theta e)$ which equal cos $\theta e$. The capacitor C3 is discharged by closing switch SW3.

Finally, a third charging operation is carried out with no signal applied to the fluxgate 1 and the system reset to zero. The time taken between the closing switch SW4 and the fall of the output of the comparator of unit 20 is determined. The count N3 of the microprocessor in this time is subtracted from counts N1 and N2 and the results N1' and N2' respectively are then proportional to the voltage output of the integrator unit 19 after the n cycles for each coil. Thus $$N1' = k \, He \sin \theta e$$

$$N2' = k \, He \cos \theta e$$

where k is a constant of proportionality.

It would be possible to obtain sin $\theta e$ and cos $\theta e$ directly from the voltage output of the integrator after n cycles but the method described with reference to FIG. 3 is preferred, because it employs a digital system in the calculation of sin $\theta e$ and cos $\theta e$, which is preferable to an analogue system which would have to be used if the voltage was measured directly.

To determine $\theta e$ and hence the course of the vessel the following relation is used.

$$\sin(A+B) = \sin A \cos B + \cos A \sin B.$$

The microprocessor calculates the sine and cosine of some reference angle $\theta R$ and uses the values obtained in the relation above. Thus:

$$\sin(\theta e + \theta R) = \sin \theta e \cos \theta R + \cos \theta e \sin \theta R$$

$$= \cos \theta R \frac{N1'}{kHe} + \sin \theta R \frac{N2'}{kHe}$$

i.e. sin $(\theta e + \theta R) \alpha N1' \cos \theta R + N2' \sin \theta R$ $\theta R$ is varied by the microprocessor until the calculation represented by the right hand side of this relation is zero. Then $\theta e = -\theta R$ and the course of the vessel is determined.

The system described above is subject to several types of errors, but the system of the present invention permits correction of these errors. The first type of error is that due to mis-match of the coils, i.e. the coils produce differently sized output signals for the same field applied to them. This is corrected by factory adjustment of the coils.

Secondly, the calculation of $\theta e$ assumes that the axis of the first detection coil is exactly parallel to the longitudinal axis of the vessel. However, as the fluxgate 1 is mounted in gimbals which would then have to have both their axes at an angle relative to the axis of the vessel, this would introduce errors as the fluxgate 1 moves in its gimbals. Therefore it is preferable to mount the fluxgate 1 so that one of the axes of its gimbals is parallel to the longitudinal axis of the vessel and one perpendicular to the axis of the vessel. Then the axis of the first detection coil is at a small angle e.g. $22\frac{1}{2}°$ to the longitudinal axis of the vessel, and the angle calculated by the microprocessor will involve some error as $\theta e$ will not be the angle of the vessel relative to magnetic north. This error is eliminated by a calculation step in the microprocessor which substracts (or adds) the error from the calculated value of $\theta e$ before it is displayed or used as a course indication.

Figure 6A:
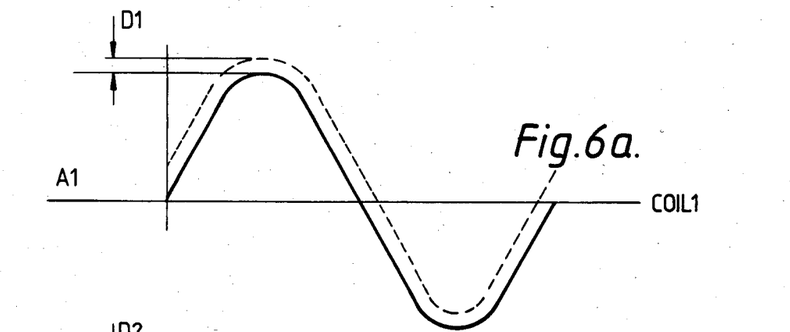
FIGS. 6a and 6b show the fixed-field errors of the system of FIG. 2.
Figure 6B:
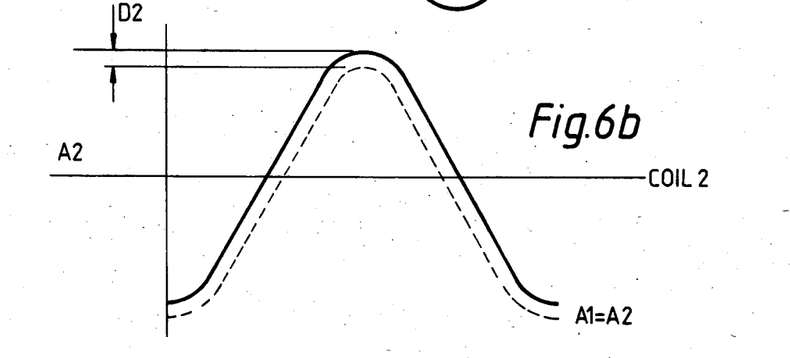

The next type of error is the fixed-field error, i.e. the error due to magnetic field from some part of the vessel. This can be eliminated by rotating the vessel through 360° (i.e. sailing it in a circle) and repeatedly measuring the outputs of the fluxgate 1. As this error is due to a field which is fixed relative to the vessel, the error appears as a biasing of the outputs of the coils by an amount $D_1$ and $D_2$ respectively from maximum amplitudes A1 and A2 as shown by the dotted lines in FIGS. 6a and 6b.

Figure 7:
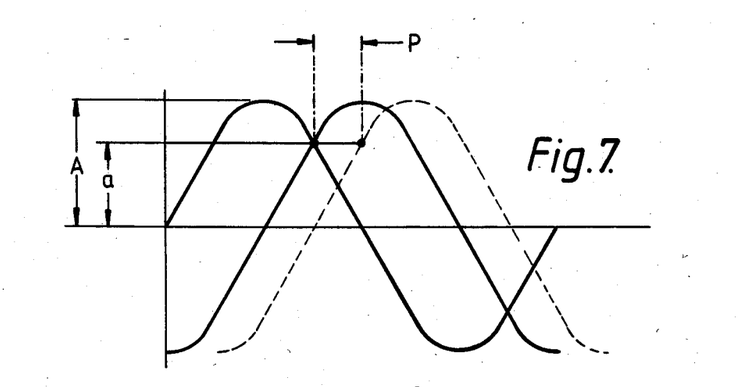
FIG. 7 shows the phase error of the system of FIG. 2.

Another error is that caused if the two coils are not exactly perpendicular. This introduces a phase error P between the sine and cosine of $\theta e$ which correspond to N1' and N2' as shown in FIG. 7. The phase error P is measured between the signals at amplitude a, which amplitude a is 0.707 of the maximum amplitude A. These sine and cosine values are outputted from computer unit 3 via line 22 in FIG. 2 and the phase error calculated.

It would be possible to eliminate all these errors by suitable programming of the microprocessor but the information would be lost when the system was turned off. Therefore it is preferable to store the error corrections in a non-volatile manner. In the embodiment of the present invention shown in FIG. 3 these error corrections are made by potentiometers VR1, VR2 and VR3, which are connected across the output of the fluxgate 1 and are switched in and out by switches SW5, SW6 and SW7 respectively. With switch SW5 closed and switches SW6 and SW7 open the resistance of VR1 is varied until the fixed-field error D1 of one detection coil is eliminated. Then SW5 is opened and SW6 is closed and the resistance of VR2 is varied until the fixed-field error D2 of the other detection coil is eliminated. Finally SW6 is opened and SW7 closed and the resistance of VR3 varied until the phase error P is eliminated. The resistances of VR1, VR2 and VR3 form a non-volatile record of the corrections necessary to eliminate the errors. The system then starts operation with switches SW5, SW6, SW7 closed to recover the information.

Figure 8A:
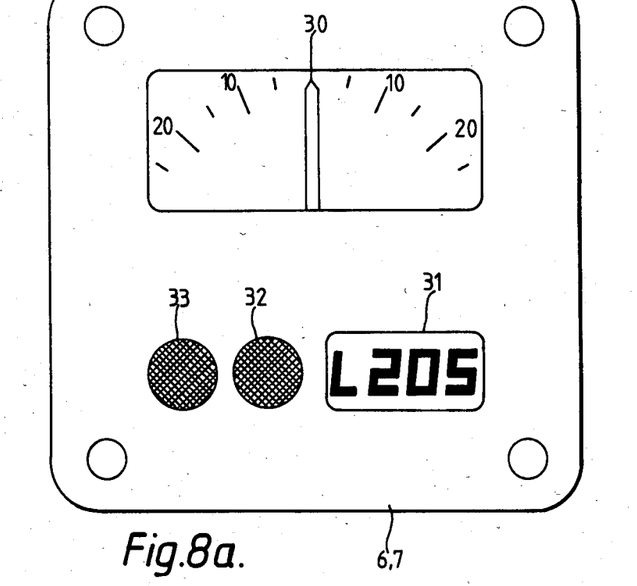
FIGS. 8a and 8b show the display unit of FIG. 2 in more detail, FIG. 8a being a face view of the display unit and FIG. 8b being a side view of the unit.
Figure 8B:
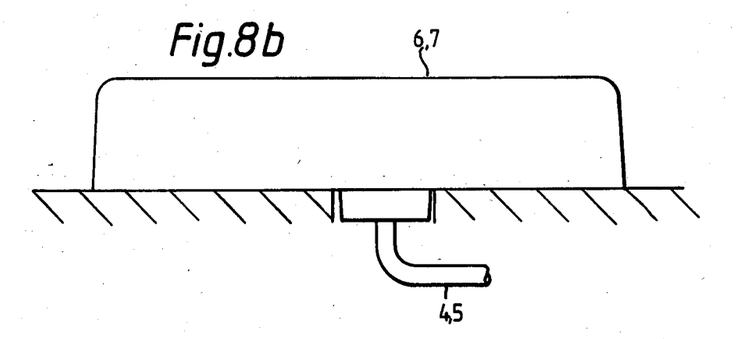
Figure 9A:
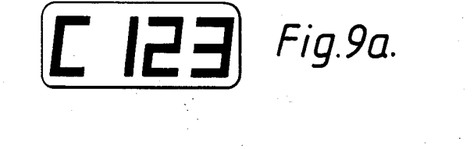
FIGS. 9a, 9b and 9c show various possible displays of the display unit of FIGS. 8a and 8b when in normal use.
Figure 9B:
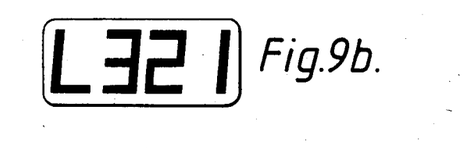
Figure 9C:
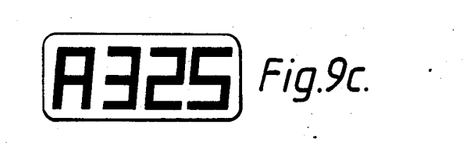

The display unit 6 or 7 of the system is shown in FIGS. 8a, 8b. It consists of circuitry powering an analogue display 30, a digital display 31 and two control buttons 32 and 33. When the system turns on, the computer unit calculates the current course relative to magnetic north and displays this on the digital display 31, preceded by the letter C as shown in FIG. 9a. If it is wished to steer the vessel on a particular course the control buttons 32,33 are depressed simultaneously and the digital display 31 displays the current course preceded by the letter L as shown in FIG. 9b and locks the digital display to that course. The analgoue display 30 then displays the deviation of the vessel from the locked course. At intervals, e.g. 15 seconds, it is desirable that the digital display also displays the average course since the course lock. The display is then as shown in FIG. 9c.

To change the locked course, one of the control buttons 31,32 is depressed. If button 31 is depressed the locked course angle is decreased by 1° every depression. Continuous depression may be made to change the locked course at 5° per second. Similarly, if control button 31 is depressed, the locked course angle is increased. Depression of both control buttons 31,32 returns the display unit 6,7 to display of the current course. The display unit may be arranged to indicate that it has accepted a depression of a control button 31 or 32 by emission of a tone from a piezo-electric buzzer. The piezo-electric buzzer may also be used to provide an off-course alarm signal, e.g. when a course error of 15° has been exceeded for more than 10 seconds. Both the analogue and digital displays 30,31 respectively are each illuminated for use at night, the level of illumination being controlled.

The displays 30,31 of the display unit 6,7 should preferably be damped to reduce the effects due to oscillation of the fluxgate 1 in its gimbals. A damping time constant of approximately 2 s has been found suitable.

Figure 10A:
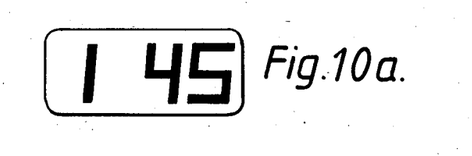
FIGS. 10a, 10b, 10c show possible displays of the display unit of FIGS. 8a and 8b when the system of FIG. 2 is calibrated.
Figure 10B:
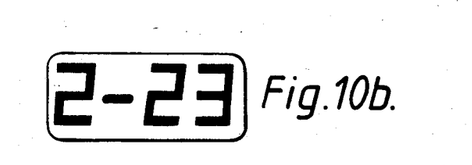
Figure 10C:
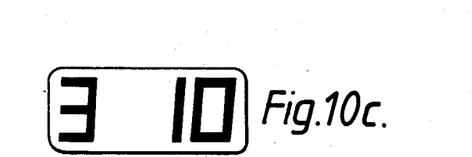

The display unit 6,7 may also be used in conjunction with the adjustment of the resistance of resistors VR1, VR2 and VR3. After rotation of the vessel through 360° the digital display 31 displays the fixed-field and phase errors. With switch SW5 closed, the analogue display 31 shows the magnitude and sense of the fixed-field error of the first detection coil, preceded by the number one as shown in FIG. 10a. The resistance of resistor VR1 is varied by e.g. screwdriver adjustment from outside the computer unit 3 until the error shown on the analogue display is zero. Then with switch SW6 closed, the analogue display 31 shows the error due to the second detection coil preceded by the number two as shown in FIG. 10b. The resistance of resistor VR2 is varied until this error is zero. Finally, with switch SW7 closed, the angle error due to phase error is displayed, preceded by the number three as shown in FIG. 10c and the resistance of resistor VR3 varied until this is zero.

Figure 11A:
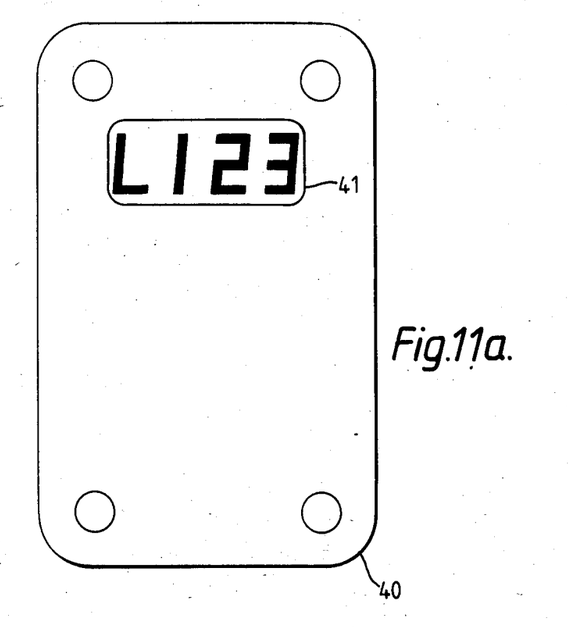
FIG. 11 shows another display device for use with the system of FIG. 2.
Figure 11B:
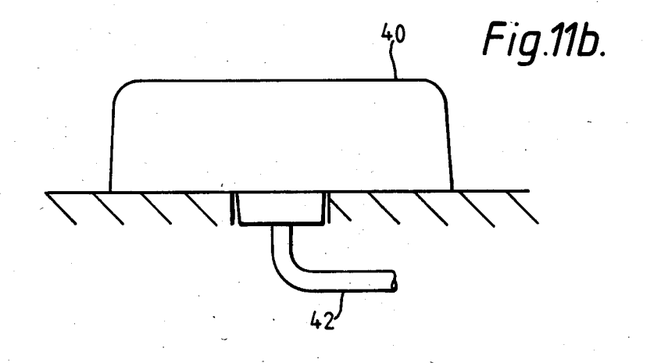

A display unit is shown in FIGS. 11a and 11b which displays only the information corresponding to the digital display 31. The display unit 40 of FIG. 11 has only a digital display 41 and is connected to the computer unit by cable 42. This display 40 may be connected to an autopilot of the vessel. The locked and actual courses are fed to the autopilot which steers the vessel accordingly.

The present invention thus provides a compass system, particularly for marine uses, which is simple to operate and easily calibrated to eliminate errors. The use of a fluxgate provides an accurate method of determining the angle of the vessel to magnetic north.

What is claimed is:

1. A method of determining the orientation relative to a magnetic axis of a fluxgate having a first and a second detection coil using an analyser, said analyser including an integrator, the method comprising:

applying an alternating drive signal to said fluxgate, thereby to generate first output pulses from said first detection coil of said fluxgate and to generate second output pulses from said second detection coil of said fluxgate;

applying a first predetermined number of said first output pulses to said integrator, thereby to cause the output of said integrator to rise from an initial value to a first integrated output;

subsequently applying a second predetermined number of said second output pulses to said integrator, thereby to generate a second integrated output; and processing said first and said second integrated output in said analyser, thereby to determine said orientation of said fluxgate.

2. A method according to claim 1, wherein:

said first predetermined number and said second predetermined number are equal;

said first predetermined number of said first output pulses are applied to said integrator, thereby to generate said first integrator output;

a predetermined constant signal is then applied to said integrator, until a third integrator output is attained;

the output of said integrator is reset to said initial value;

said second predetermined number of said second output pulses are applied to said integrator, thereby to generate said second integrator output; and said predetermined constant signal is then applied to said integrator until said third integrator output is attained.

3. A method according to claim 2, wherein:

a first measured time is obtained from the time between the application of said predetermined constant signal when said integrator has generated said first integrator output and the attaining of said third integrator output;

a second measured time is obtained from the time between the application of said predetermined constant signal when said integrator has generated said second integrator output and the attaining of said third integrator output; and said first and second measured times are analysed in said analyser, thereby to determine said orientation of said fluxgate.

4. A method according to claim 3, wherein said integrator is reset to its original value and said predetermined constant signal is applied to said integrator until said third integrator output is attained, the time between the application of said predetermined signal and said attaining of said third integrator output is measured, thereby to obtain a third measured time, and said first, second and third measured times are analysed in said analyser to determine said orientation of said fluxgate 5. A method according to claim 4, wherein said first, second and third measured times are measured digitally, said analyser analysing said first, second and third measured times together with the digital value of a reference orientation, and said analyser varies said reference orientation until said reference orientation equals said orientation of said fluxgate.

6. A method according to claim 1, wherein said first and said second detection coils are arranged approximately perpendicular to each other.

7. A method of navigating a vessel having a fluxgate with a first and a second detection coil, an analyser for analysing the fluxgate output, said analyser including an integrator, and means for steering said vessel; the method comprising:

applying an alternating drive signal to said fluxgate, thereby to generate first output pulses from said first detection coil of said fluxgate and to generate second output pulses from said second detection coil of said fluxgate;

applying a first predetermined number of said first output pulses to said integrator, thereby to cause the output of said integrator to rise from an initial value to a first integrated output;

subsequently applying a second predetermined number of said second output pulses to said integrator, thereby to generate a second integrated output;

processing said first and said second integrated output in said analyser, thereby to determine said orientation of said fluxgate;

deriving the orientation of said vessel relative to said magnetic axis from said orientation of said fluxgate; and controlling said means for steering said vessel, so that said vessel maintains a predetermined orientation relative to said magnetic axis.

8. A compass system comprising:

a fluxgate, said fluxgate having a first and second detection coil;

means for applying an alternating drive signal to said fluxgate, thereby to generate first and second output pulses from said first and said second detection coils respectively; and an analyser for analysing said first and second output pulses, the analyser including an integrator and means for applying a first predetermined number of said first output pulses and a second predetermined number of said second output pulses sequentially to said integrator, whereby the integrator generates first and second integrator outputs corresponding respectively to said first predetermined number of said first output pulses and said second predetermined number of said second output pulses, said analyser being adapted to analyse said first and second integrator outputs to determine said orientation of said fluxgate.

9. A compass system according to claim 8, wherein said analyser includes means for applying a predetermined constant signal to said integrator.

10. A compass system according to claim 8, wherein said analyser includes means for adjustably biasing said first and second output pulses, thereby to eliminate errors in the determination of said orientation of said fluxgate.

* * * * *